(12) United States Patent
Yonaha (10) Patent No.: US 11,263,739 B2
(45) Date of Patent: Mar. 1, 2022

(54) REPAIR LENGTH DETERMINATION METHOD AND REPAIR LENGTH DETERMINATION APPARATUS

(71) Applicant: FUJIFILM Corporation, Tokyo (JP)

(72) Inventor: Makoto Yonaha, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/933,817

(22) Filed: Jul. 20, 2020

(65) Prior Publication Data

US 2020/0349694 A1     Nov. 5, 2020

Related U.S. Application Data

(63) Continuation of application No. PCT/JP2018/046364, filed on Dec. 17, 2018.

(30) Foreign Application Priority Data

Jan. 31, 2018   (JP) .............................. JP2018-015431

(51) Int. Cl.
   *G06T 7/00*       (2017.01)
   *G01B 11/02*      (2006.01)
   (Continued)

(52) U.S. Cl.
   CPC ............ *G06T 7/0004* (2013.01); *G01B 11/02* (2013.01); *G01N 21/84* (2013.01); *G06T 7/60* (2013.01); *G06T 2207/30132* (2013.01)

(58) Field of Classification Search
   CPC ................. G06T 7/0004; G06T 7/60; G06T 2207/30132; G06T 7/00; G01B 11/02; G01N 21/84; G01N 21/88
   See application file for complete search history.

(56) References Cited

U.S. PATENT DOCUMENTS 6,711,284 B1   3/2004  Koide
9,361,009 B2 * 6/2016  Munter ............... G06F 3/04847
(Continued)

FOREIGN PATENT DOCUMENTS

CN    102680480 A    9/2012
CN    102759337 A   10/2012
(Continued)

OTHER PUBLICATIONS

Eisa, "Numerical Curve Length Calculation Using Polynomial Interpolation," Journal of Mathematical Imaging and Vision vol. 49, pp. 377-383(2014) (Year: 2014).*

(Continued)

*Primary Examiner* — Joseph Suh
(74) *Attorney, Agent, or Firm* — Studebaker & Brackett PC (57) ABSTRACT

A repair length determination method that can accurately calculate a repair region (repair length) in which repair is to be performed in a structure and an apparatus are provided. The repair length determination method has: an image acquiring step of acquiring an image obtained by imaging a repair target region; a detection step of detecting a crack from the image; a display step of displaying a crack; a pointing step of pointing a plurality of points including two points at both ends of the crack; an interpolation curve creating step of creating an interpolation curve by using the pointed points; and a repair length determining step of measuring a length of the interpolation curve and determining a repair length. The apparatus is used for the determination method.

21 Claims, 9 Drawing Sheets

(51) Int. Cl.
*G01N 21/84* (2006.01)
*G06T 7/60* (2017.01)

(56) References Cited

U.S. PATENT DOCUMENTS

| | | | |
|---|---|---|---|
| 2008/0281214 A1* | 11/2008 | Elle | A61B 5/1107 600/508 |
| 2010/0157043 A1* | 6/2010 | Demers | G01N 21/892 348/84 |
| 2010/0329081 A1* | 12/2010 | Sullivan | E21B 47/14 367/120 |
| 2013/0044936 A1 | 2/2013 | Wang | |
| 2013/0218003 A1* | 8/2013 | Rothgang | A61B 5/062 600/414 |
| 2014/0112825 A1* | 4/2014 | Willett | A61L 27/3608 422/22 |
| 2014/0184786 A1* | 7/2014 | Georgeson | G01N 21/8422 348/128 |
| 2016/0055289 A1* | 2/2016 | Cao | G06F 30/398 716/112 |
| 2016/0133008 A1 | 5/2016 | Kuratate et al. | |
| 2016/0253543 A1* | 9/2016 | Bauchspies | G06K 9/00926 382/125 |
| 2017/0270696 A1* | 9/2017 | Schiller | G06T 11/203 |
| 2017/0307569 A1* | 10/2017 | Tissenier | G01N 29/225 |
| 2017/0331881 A1* | 11/2017 | Chandramouli | H04L 47/82 |
| 2017/0347031 A1* | 11/2017 | Ajito | H04N 5/23212 |
| 2018/0217688 A1* | 8/2018 | Tsuji | G06F 3/04162 |
| 2019/0051044 A1* | 2/2019 | Chui | G06T 15/06 |
| 2019/0164318 A1* | 5/2019 | Schiller | G06F 3/04847 |
| 2020/0273279 A1* | 8/2020 | Rausch | G07D 7/2016 |

FOREIGN PATENT DOCUMENTS

| | | |
|---|---|---|
| CN | 103667797 A | 3/2014 |
| CN | 104007175 A | 8/2014 |
| CN | 104749617 A | 7/2015 |
| EP | 2 752 657 A2 | 7/2014 |
| JP | H01-195351 A | 8/1989 |
| JP | 2001-124522 A | 5/2001 |
| JP | 4006007 B2 | 11/2007 |
| JP | 4488308 B2 | 6/2010 |
| JP | 2016-090548 A | 5/2016 |
| JP | 2016-099235 A | 5/2016 |

OTHER PUBLICATIONS

Garcia G.L. et al.; "Cavitation resistance of epoxy-based multilayer coatings: Surface damage and crack growth kinetics during the incubation stage"; Wear, vol. 316, No. 1; pp. 124-132; XP028851933; Apr. 28, 2014; ISSN: 0043-1648.
The extended European search report issued by the European Patent Office dated Dec. 1, 2020, which corresponds to European Patent Application No. 16933817.2-1010 and is related to U.S. Appl. No. 16/933,817.
International Search Report issued in PCT/JP2018/046364; dated Mar. 5, 2019.
International Preliminary Report On Patentability and Written Opinion Bsued in PCT/JP2018/046364; dated Aug. 4, 2020.
An Office Action mailed by China National Intellectual Property Administration dated Jul. 16, 2021, which corresponds to Chinese Patent Application No. 201880088067.1 and is related to U.S. Appl. No. 16/933,817; with English language translation.
An Office Action mailed by The State Intellectual Property Office of People's Republic of China dated Nov. 19, 2021, which corresponds to Chinese Patent Application No. 201880088067.1 and is related to U.S. Appl. No. 16/933,817; with English translation.

* cited by examiner

| No. | MAXIMUM WIDTH OF CRACK | INTERPOLATION CURVE LENGTH |
|---|---|---|
| 1 | 0.23 mm | 0.34 m |
| 2 | 0.21 mm | 0.97 m |
| 3 | 0.31 mm | 0.12 m |
| ⋮ | ⋮ | ⋮ |

FIG. 10

| BAND GROUP | MAXIMUM WIDTH OF CRACK | TOTAL LENGTH OF INTERPOLATION CURVE |
|---|---|---|
| I | 0.2 TO 0.3 mm | 1.54 m |
| II | 0.3 TO 0.5 mm | 0.76 m |
| III | 0.5 mm OR MORE | 0.27 m |

REPAIR LENGTH DETERMINATION METHOD AND REPAIR LENGTH DETERMINATION APPARATUS

CROSS-REFERENCE TO RELATED APPLICATIONS

The present application is a Continuation of PCT International Application No. PCT/JP2018/046364 filed on Dec. 17, 2018 claiming priority under 35 U.S.C § 119(a) to Japanese Patent Application No. 2018-015431 filed on Jan. 31, 2018. Each of the above applications is hereby expressly incorporated by reference, in its entirety, into the present application.

BACKGROUND OF THE INVENTION

1. Field of the Invention

The present invention relates to a repair length determination method and a repair length determination apparatus, and particularly to a repair length determination method and a repair length determination apparatus using a captured image of a photographic subject.

2. Description of the Related Art

Social infrastructures such as bridges need to be inspected on a regular basis. In addition, in order to inspect a structure efficiently, a crack defect detection method is proposed. In the method, a defect (crack defect) is automatically detected by processing an image acquired by capturing an image of the structure.

For example, JP2016-99235A describes a structure maintenance management service system that acquires information of a captured image of a structure, generates normal-position image information, detects the length of a crack part, and calculates the length of an actual crack part on the basis of a reduced scale of the image information. JP2016-90548A describes a crack information collection method for acquiring a captured image of an inspection target region for a crack in a structure, detecting a crack pixel group from the image, and collecting crack information from positions of a start point, a turning point, and an end point of the pixel group.

SUMMARY OF THE INVENTION

An operation for repairing a crack of a structure is performed by covering the crack of the structure with a repair material. Thus, in order to obtain a necessary amount of the repair material, it is necessary to calculate a repair region (repair length) in which repair is to be performed. In a case where a crack of a structure is to be repaired, as illustrated in JP2016-99235A and JP2016-90548A, the repair region is determined on the basis of an image. However, since there are both a crack to be repaired and a crack that does not need to be repaired in the structure, the repair length to be calculated (actual repair length) and a crack detection result have been different from each other.

In addition, a crack is repaired by applying, injecting, or filling with (hereinafter referred to as "applying") a repair material. The repair material does not need to be applied exactly on the crack, and the crack is at least included in the area in which the repair material is to be applied. Thus, the repair material is applied on the basis of a curve obtained by blunting an actual crack. Accordingly, the length of the actual crack and the length to be used for repair may be different from each other.

Furthermore, the repair material may be applied on a plurality of cracks continuously even if actual cracks are not continuous. However, since the cracks are recognized as a plurality of cracks in automatic detection, the number of cracks to be repaired (number of times of repair) may be different, and the repair length to be calculated and the repair length to be actually repaired may be different from each other.

In the above manner, if the crack detection result is directly used to determine the repair region, the calculated repair length and the repair length to be actually repaired have been different from each other. As a result, problems have been generated, such as excess or shortage of the repair material to be used, and it has been demanded to know about a more accurate amount of the repair material.

The present invention has been made in view of the above circumstances, and an object thereof is to provide a repair length determination method and a repair length determination apparatus for accurately calculating a region (repair length) in which repair is to be performed in a structure that is a repair target.

In order to achieve the object of the present invention, a repair length determination method according to the present invention has: an image acquiring step of acquiring, by an image acquiring unit, an image obtained by imaging a crack repair target region in a structure; a detection step of detecting, by a crack detecting unit, a crack from the acquired image; a display step of displaying, by a display control unit, the crack detected in the detection step; a pointing step of pointing a plurality of points including two points at both ends of the crack in response to an instruction from an operation unit; an interpolation curve creating step of creating, by an interpolation curve creating unit, an interpolation curve by using the points pointed in the pointing step: and a repair length determining step of detecting, by a repair length determining unit, a length of the interpolation curve and determining a repair length.

According to the present invention, after the image has been acquired and the crack has been detected, by pointing the plurality of points including the two points of the crack and creating the interpolation curve by using the plurality of points, a curve corresponding to the crack can be created. In addition, by setting the interpolation curve as a repair region (repair length) of a crack to be repaired, the repair length to perform repair can be calculated, and an accurate amount of the repair material can be calculated.

In an aspect of the present invention, it is preferable that, in the display step, at least a repair-target crack and a non-repair-target crack be displayed by changing a display method to be distinguishable from each other in accordance with a width of the crack.

According to this aspect, the repair-target crack and the non-repair-target crack can be recognized on the image.

In an aspect of the present invention, it is preferable that the display method be selected from a line color, a line type, and a line blinking speed corresponding to the crack.

This aspect limits the display method of the repair-target crack and the non-repair-target crack, and the repair-target crack and the non-repair-target crack can be distinguished from each other by being displayed by using the line color, the line type, and the line blinking speed corresponding to the crack.

An aspect of the present invention preferably has a filtering step of displaying, by the display control unit, only the repair-target crack.

According to this aspect, by displaying only the repair-target crack in the filtering step, operations in the subsequent steps are performed with ease.

In an aspect of the present invention, it is preferable that, in the pointing step, on the basis of a result of the crack detected in the detection step, a pointed point be corrected to a position of the crack near a pointed position.

According to this aspect, by correcting the pointed point to the position of the crack if the pointed position differs from the position of the crack, a more accurate interpolation curve corresponding to the crack can be created.

In an aspect of the present invention, it is preferable that, in the pointing step, when the two points at both ends of the crack are pointed, on the basis of a result of the crack detected in the detection step, a position of one point or positions of a plurality of points between the two points at both ends be automatically pointed.

According to this aspect, by pointing the two points at both ends of the crack and pointing the position of the point or the positions of the plurality of points of the crack therebetween, the operation can be simplified. In addition, by automatic pointing, pointing can be performed under the same conditions, and the interpolation curve can be stably created.

An aspect of the present invention preferably has an output step of outputting, by an output unit, drawing information of the interpolation curve.

According to this aspect, by outputting the drawing information of the interpolation curve, the interpolation curve can be visually checked. Thus, it is possible to check whether the created interpolation curve corresponds to an actual repair region for a crack to be repaired.

An aspect of the present invention preferably has an output step of outputting, by an output unit, information of a width of the crack and a length of the interpolation curve corresponding to the width.

According to this aspect, by outputting the information of the width of the crack and the length of the interpolation curve corresponding to the width, the repair length corresponding to the width can be checked.

In an aspect of the present invention, it is preferable that the output unit output a repair method corresponding to the width.

The repair method for a crack differs according to the width. According to this aspect, by outputting the repair method corresponding to the width, a repair material corresponding to the repair method can be prepared.

In an aspect of the present invention, it is preferable that, in the output step, data after tilt correction be output.

According to this aspect, by outputting the data after tilt correction, a more accurate width of the crack and a more accurate repair length can be determined. In addition, the repair position can be checked on the output image.

In an aspect of the present invention, it is preferable that the interpolation curve be a spline curve or a Bezier curve.

This aspect illustrates examples of the interpolation curve. By creating the interpolation curve as a spline curve or a Bezier curve, a curve corresponding to the crack for actually performing repair can be created.

In order to achieve the object of the present invention, a repair length determination apparatus according to the present invention includes: an image acquiring unit (image acquirer) that acquires an image obtained by imaging a crack repair target region in a structure; a crack detecting unit (processor) that detects a crack from the image acquired by the image acquiring unit; a display control unit (processor) that displays the crack detected by the crack detecting unit; an operation unit (operation interface) that points a plurality of points including two points at both ends of the crack; an interpolation curve creating unit (processor) that creates an interpolation curve by using the points pointed by the operation unit; and a repair length determining unit (processor) that detects a length of the interpolation curve and determines a repair length.

In an aspect of the present invention, it is preferable that the display control unit display at least a repair-target crack and a non-repair-target crack by changing a display method to be distinguishable from each other in accordance with a width of the crack.

In an aspect of the present invention, it is preferable that the display method be at least one selected from a line color, a line type, and a line blinking speed corresponding to the crack.

In an aspect of the present invention, it is preferable that the display control unit display only the repair-target crack.

In an aspect of the present invention, it is preferable that, on the basis of a result of the crack detected by the crack detecting unit, the interpolation curve creating unit correct a point pointed by the operation unit to a position of the crack near a pointed position.

In an aspect of the present invention, it is preferable that, when the two points at both ends of the crack are pointed, on the basis of a result of the crack detected by the crack detecting unit, the interpolation curve creating unit automatically point a position of one point or positions of a plurality of points between the two points at both ends.

An aspect of the present invention preferably has an output unit (data output interface) that outputs drawing information of the interpolation curve.

An aspect of the present invention preferably has an output unit (data output interface) that outputs information of a width of the crack and a length of the interpolation curve corresponding to the width.

In an aspect of the present invention, it is preferable that a repair method corresponding to the width be output.

In an aspect of the present invention, it is preferable that the output unit output data after tilt correction.

The above-described repair length determination apparatus is obtained by developing the repair length determination method as a repair length determination apparatus. The repair length determination apparatus can produce the same effects as the repair length determination method.

In the repair length determination method and the repair length determination apparatus according to the present invention, the plurality of points including both ends of the crack are pointed, and the interpolation curve is created by using the pointed points. By detecting the length of this interpolation curve, the region (repair length) in which repair is to be performed can be accurately calculated.

DESCRIPTION OF THE PREFERRED EMBODIMENTS

Now, a repair length determination method and a repair length determination apparatus according to the present invention will be described below in accordance with the attached drawings.

<Structure of Bridge>

Figure 1:
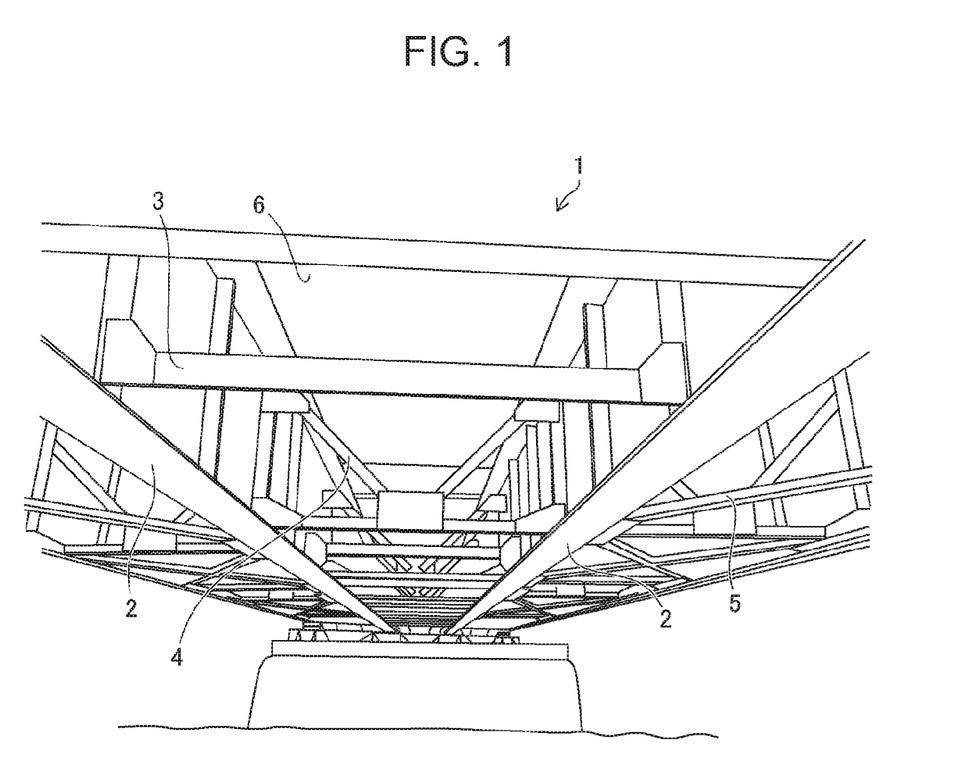
FIG. 1 illustrates an external appearance a bridge from below.

FIG. 1 is an upward perspective view of a bridge 1, which is a structure. The bridge 1 illustrated in FIG. 1 has a three-dimensional structure of main girders 2, a cross beam 3, a cross frame 4, a lateral frame 5, and a deck slab 6 and is constructed by coupling these members by bolts, rivets, welding, or the like. Above the main girder 2 and other members, the deck slab 6 is disposed, and vehicles and the like travel on the deck slab 6. The deck slab 6 is typically made of reinforced concrete. The main girder 2 is a member that spans the area between abutments or piers and that supports a load of vehicles and the like on the deck slab 6. The main girder 2 has a surface (vertical surface) intersecting with the surface of the deck slab 6 (horizontal surface). The cross beam 3 is a member that couples the plurality of main girders 2 so that the main girders 2 support the load. The cross frame 4 and the lateral frame 5 are members that couple the main girders 2 to one another to resist a lateral load caused by wind and earthquake. Although this embodiment describes a case where the bridge 1 is a target (structure), the target structure is not limited to a bridge and may be a tunnel, a building, a road, and the like.

<Configuration of Image Processing System>

Figure 2:
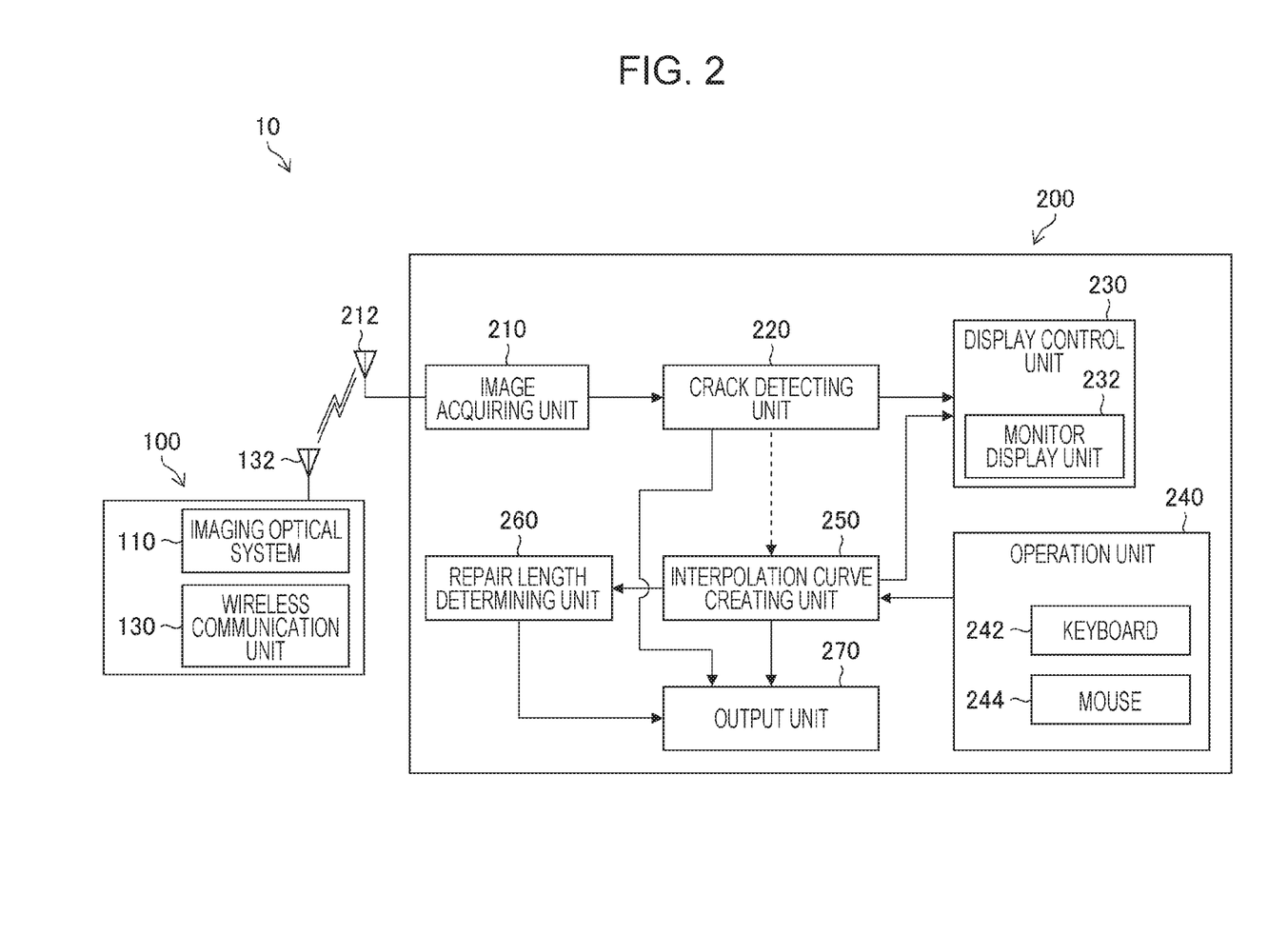
FIG. 2 is a block diagram illustrating a configuration of an image processing system.

FIG. 2 is a block diagram illustrating a schematic configuration of an image processing system 10. The image processing system 10 includes a digital camera 100 (an imaging apparatus) and a system main body 200 (a repair length determination apparatus). The image processing system 10 is a system that calculates, on the basis of an image acquired by capturing an image of a photographic subject, a repair length of a crack that needs to be repaired (details will be described later) and may be applicable to a digital camera, a smartphone, a tablet terminal, a personal computer, or the like. Note that the digital camera 100 and the system main body 200 may be incorporated in different housings or may be integrated. In addition, the digital camera 100 may be incorporated as part of the system main body 200, and the digital camera 100 and the system main body 200 may constitute a repair length determination apparatus according to the present invention.

<Configuration of Digital Camera>

The digital camera 100 acquires an image by using an imaging optical system 110 including an imaging lens and an imaging element that are not illustrated. Examples of the imaging element include a charge coupled device (CCD) imaging element and a complementary metal-oxide semiconductor (CMOS) imaging element. A color filter of R (red), G (green), or B (blue) is provided on a light-receiving surface of the imaging element, and a color image of the photographic subject can be acquired on the basis of signals of the respective colors. The digital camera 100 performs wireless communication with the system main body 200 through a wireless communication unit 130 and an antenna 132, a captured image is input to an image acquiring unit 210, and processing described later is performed.

The captured image may be an image generated by combining a plurality of separate images that will be described later. In addition, for example, if the size of a panel is small and the digital camera 100 can capture an image (entire image) of the deck slab 6 including one panel at an appropriate resolution at a single time, the image acquired through single-time image capturing may be used.

The digital camera 100 may be, for example, a general-purpose compact digital camera having approximately 5000×4000 pixels.

<Configuration of System Main Body>

The system main body 200 is mainly constituted by the image acquiring unit 210, a crack detecting unit 220, a display control unit 230, an operation unit 240, an interpolation curve creating unit 250, a repair length determining unit 260, and an output unit 270. These are connected to one another to transmit and receive necessary information. In addition, the system main body 200 performs wireless communication with the digital camera 100 through an antenna 212 and acquires an image captured by the digital camera 100.

<<Image Acquiring Unit 210>>

The image acquiring unit 210 acquires a captured image of the bridge 1 from the digital camera 100 (or a recording medium, a network, or the like). The image may be a plurality of images that are obtained by capturing images of the bridge 1 separately or may be an image that is acquired through single-time image capturing. If a plurality of images are combined into one image, correspondence points between the images are detected, and a captured image is formed on the basis of the correspondence points between the images.

<<Crack Detecting Unit 220>>

The crack detecting unit 220 extracts and measures a crack in the captured image.

<<Display Control Unit 230>>

The display control unit 230 includes a monitor display unit 232 and generally controls display screens for displaying an input image, a detected crack and information of the crack, and information of a created interpolation curve or the like.

<<Operation Unit 240>>

The operation unit 240 includes a keyboard 242 and a mouse 244 as an input device and a pointing device. In addition, if the monitor display unit 232 has a touch panel, the touch panel and the like are also included. Through such devices and a screen of the monitor display unit 232, a user can perform necessary operations for performing a repair length determination method according to this embodiment (described later). The operations include designation of pointing positions of a crack, input of crack information, and the like.

<<Interpolation Curve Creating Unit 250>>

The interpolation curve creating unit 250 creates an interpolation curve from positions pointed through the operation unit 240.

<<Repair Length Determining Unit 260>>

The repair length determining unit 260 measures the length of the interpolation curve created by the interpolation curve creating unit 250.

<<Output Unit 270>>

The output unit 270 outputs the interpolation curve created by the interpolation curve creating unit 250 as drawing data. In addition, the output unit 270 also outputs the length of the interpolation curve (repair length) measured by the repair length determining unit 260 and information of the interpolation curve and information of a crack detected by the crack detecting unit 220 as characters or data in the form of a table. Note that such information may be output as drawing data.

Functions of the units of the system main body 200 can be implemented by using various processors. Various processors include, for example, a central processing unit (CPU), which is a general-purpose processor that implements various functions by executing software (program). The above-described various processors also include a programmable logic device (PLD), which is a processor in which the circuit configuration is changeable after manufacture, such as a field programmable gate array (FPGA). The above-described various processors further include a dedicated electric circuit, which is a processor having a circuit configuration that is specially designed to execute specific processing, such as an application specific integrated circuit (ASIC), and the like.

The function of each unit may be implemented by one processor or may be implemented by a plurality of processors in combination. In addition, a plurality of functions may be implemented by one processor. As a first example for constituting a plurality of functions with one processor, one processor may be constituted by a combination of one or more CPUs and software, and this processor may implement a plurality of functions, as typified by a computer such as a client or a server. As a second example, a processor may be used that implements the functions of the entire system with one integrated circuit (IC) chip, as typified by a system on chip (SoC) or the like. In this manner, various functions are constituted by one or more of the above various processors in terms of hardware configuration. More specifically, the hardware configuration of these various processors is electric circuitry constituted by combining circuit elements such as semiconductor elements.

When the above processor or electric circuitry executes software (program), a processor (computer) readable code of the software to be executed is stored in a non-transitory recording medium such as a read-only memory (ROM), and the processor refers to the software. The code may also be recorded on, instead of the ROM, a non-transitory recording medium such as any magnetooptical recording device or a semiconductor memory. In the processing using software, for example, a random access memory (RAM) is used as a temporary storage area, and for example, data stored in an electronically erasable and programmable read-only memory (EEPROM) is referred to.

<Procedure of Image Processing>

Figure 3:
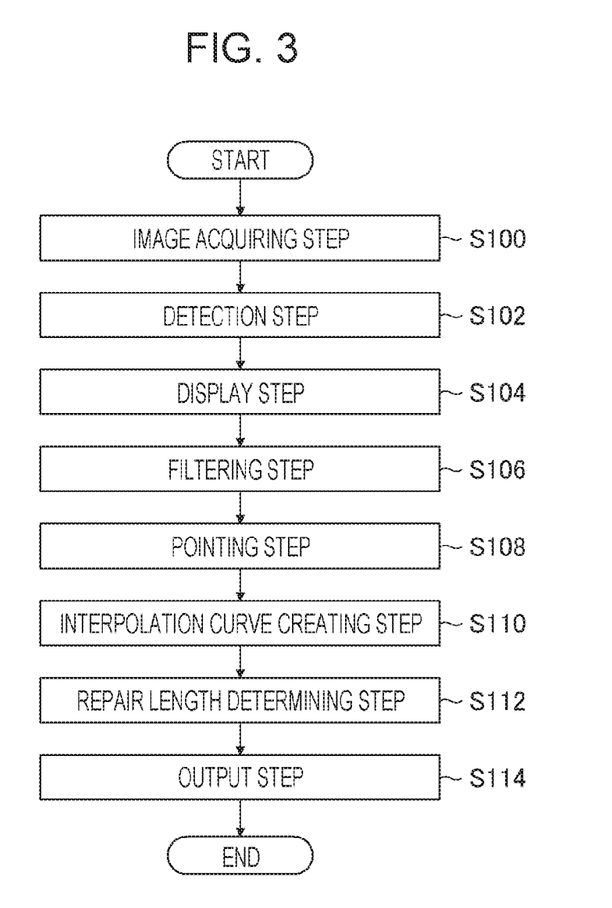
FIG. 3 is a flowchart of a repair length determination method.

Image processing performed by the image processing system 10 will be described. FIG. 3 is a flowchart illustrating a procedure of the image processing (including the steps in the repair length determination method according to the present invention).

<Image Acquiring Step>

First, a plurality of captured images are acquired (step S100; image acquiring step). The plurality of captured images are obtained by the digital camera 100 separately capturing images of different portions of the bridge 1 (structure). The captured images are images obtained by imaging a crack repair target region. The system main body 200 acquires these plurality of captured images through the digital camera 100 (the imaging optical system 110, the wireless communication unit 130, the antenna 132, and the antenna 212) and the image acquiring unit 210.

Figure 4:
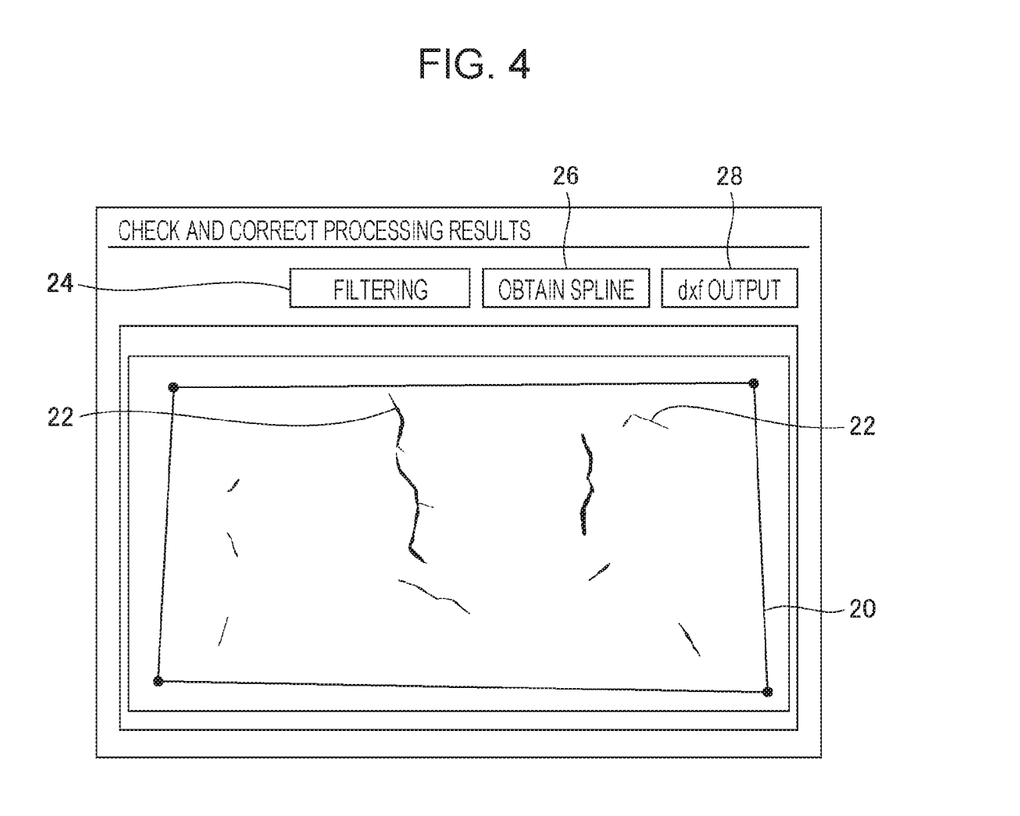
FIG. 4 illustrates a captured image of the bridge.

Upon the images being captured, the image acquiring unit 210 combines the plurality of captured images into one image. To combine the captured images, information for combination is calculated. For example, correspondence points between the captured images and a homography matrix or the like on the basis of the correspondence points are calculated. Then, the images are combined on the basis of the correspondence points. Note that the step of combining the images can be skipped if the entire region can be captured in one image. The acquired image may be displayed on the monitor display unit 232 under control of the display control unit 230. FIG. 4 illustrates a captured image of the bridge 1. In FIG. 4, an entire image 20 after combination is illustrated. Cracks 22 can be seen in the entire image 20.

<Detection Step>

From the image acquired in the image acquiring step, cracks are detected (step S102; detection step). Items to measure for crack detection are the position, size, direction, area, shape, and the like and may be set in accordance with conditions such as the type, characteristics, inspection purpose, and the like of the structure. In crack detection, the crack detecting unit 220 represents the detection result as a vector, a line segment having a start point and an end point, or a group thereof.

Crack detection may be performed by various methods. For example, a crack detection method described in JP4006007B can be employed. This method is a crack detection method having a step of creating a wavelet image and a step of determining a crack region on the basis of the wavelet image. In the step of creating a wavelet image, wavelet coefficients corresponding to two concentrations to be compared are calculated, wavelet coefficients in a case where the two concentrations are changed are calculated to create a wavelet coefficient table, and wavelet transformation is performed on an input image that is obtained by capturing an image of a concrete surface that is a crack detection target. In the step of determining a crack region, a crack region and a non-crack region are determined by comparing the wavelet coefficient of a pixel of interest with a threshold value. The threshold value is a wavelet coefficient corresponding to the average concentration of neighboring pixels within a local region and the concentration of the pixel of interest in the wavelet coefficient table.

In addition, the length of a short side and the length of a long side of a captured image can be input in advance, and the width of a crack can be detected on the basis of a structure that is an image capturing target, an image capturing distance from the digital camera 100, and the number of pixels of the digital camera 100. Furthermore, the width of the crack is preferably detected by using an image after tilt correction. Tilt correction can correct distortion of a building to obtain a photograph as if viewed from the front. In addition, by using the corrected image, the length of the crack and the width of the crack can be measured with higher accuracy.

<Display Step>

Figure 5:
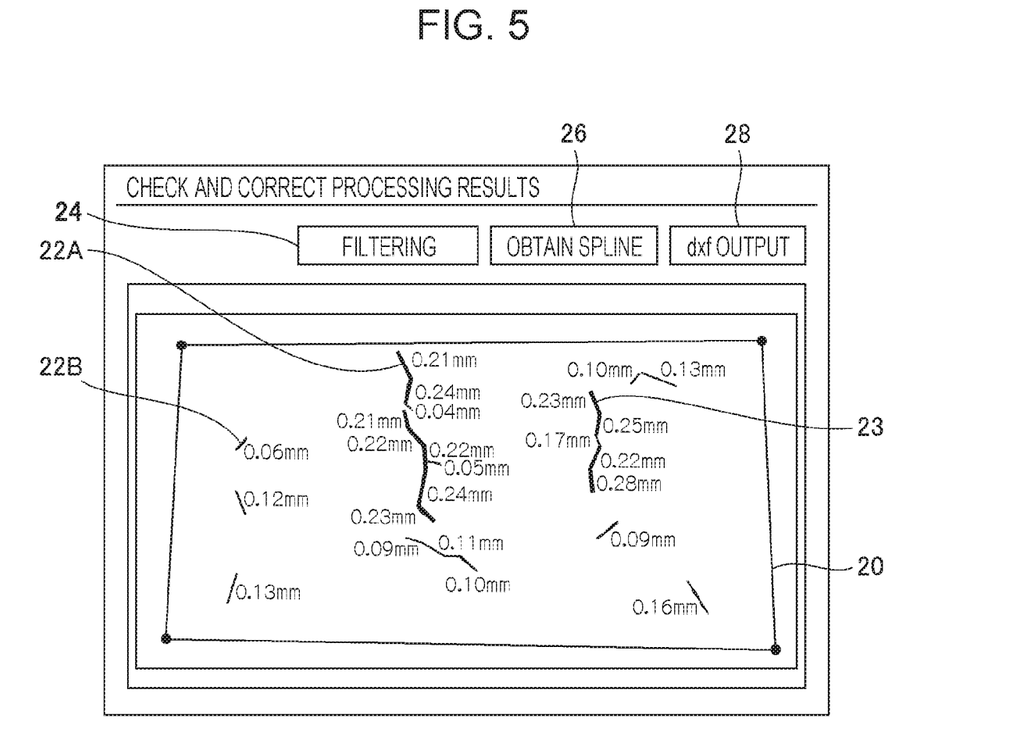
FIG. 5 illustrates cracks detected and displayed in an image.

The cracks detected in the detection step are mapped in the image acquired in the image acquiring step, and the image is displayed (step S104; display step). The image in which the measurement results are mapped is, as illustrated in FIG. 5, displayed on the monitor display unit 232 under control of the display control unit 230. With the mapping, positions of the cracks can be indicated, and also widths of the cracks can be displayed. In addition, characters, figures, symbols, or the like associated with the measurement results can be displayed on a screen. The displayed characters, figures, symbols, or the like may be selected by an operation through the operation unit 240 (the keyboard 242 and/or the mouse 244), and in accordance with the selection, the detection results and measurement results are displayed on the monitor display unit 232 of the display control unit 230. The characters, figures, symbols, or the like may simplify or emphasize actual cracks or may be displayed in different forms in accordance with sizes (widths) or the like of the cracks. In FIG. 5, a repair-target crack 22A (a crack with a width of 0.2 mm or more) that needs to be repaired is displayed by a thick line, a non-repair-target crack 22B (a crack with a width of less than 0.2 mm) that does not need to be repaired is displayed by a thin line. Although the lines with two types of thickness are used for display in accordance with the width of the crack in FIG. 5, lines with three or more types of thickness may also be used in accordance with the width of the crack. In addition, as a method for displaying a crack in accordance with the width of the crack, a line type (e.g., a straight line, a broken line, or a chain line), a line color, a line blinking speed, or a combination thereof may be used for display. Furthermore, by setting to display a non-repair-target crack to be transparent, only a repair-target crack can be displayed without performing the subsequent filtering step. By using the above display method, the repair-target crack and the non-repair-target crack can be displayed to be distinguishable from each other.

<Filtering Step>

Figure 6:
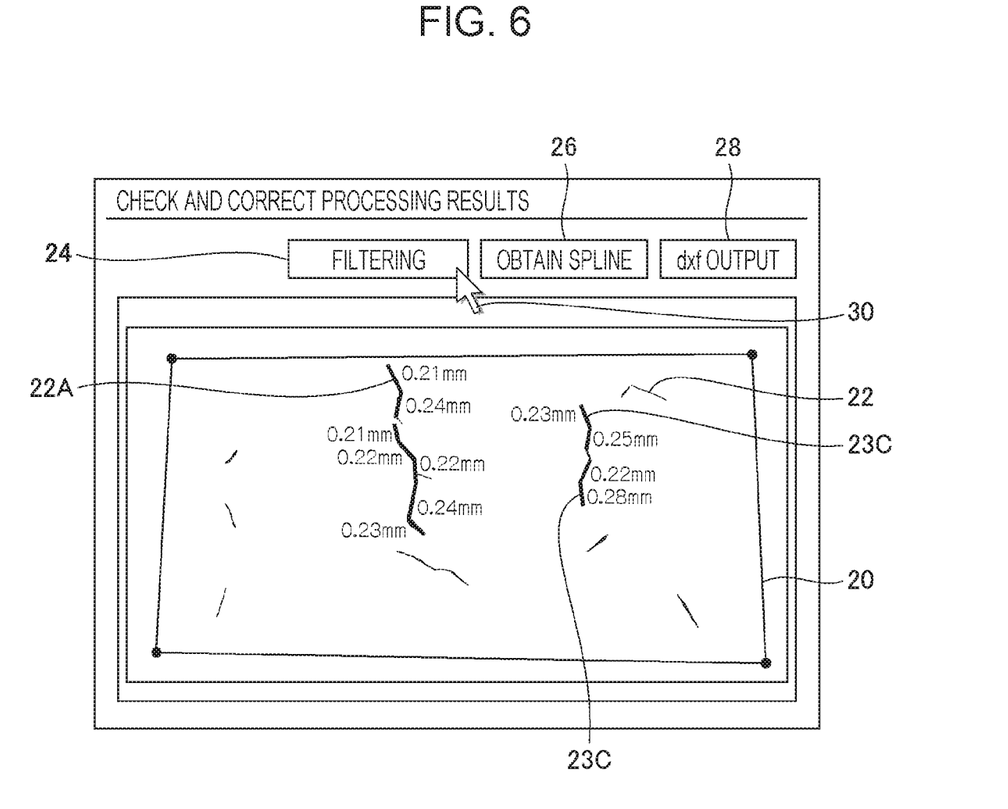
FIG. 6 illustrates only a repair-target crack displayed after a filtering step.

Filtering may be performed to delete the non-repair-target crack from the image displayed on the monitor display unit 232 in the display step by the display control unit 230 (step S106; filtering step). The filtering step may be performed as necessary, and may not be performed if the non-repair-target crack does not disturb the subsequent operation even if being displayed. The filtering is performed by pressing a "filtering" button 24 illustrated in FIG. 6. By performing the filtering step, as illustrated in FIG. 6, the non-repair-target crack can be deleted from display.

<Pointing Step>

Subsequently, in response to an instruction from a user through the operation unit 240 (the keyboard 242 and the mouse 244), a plurality of points in the repair-target crack 22A displayed on the monitor display unit 232 are pointed (step S108; pointing step).

Figure 7:
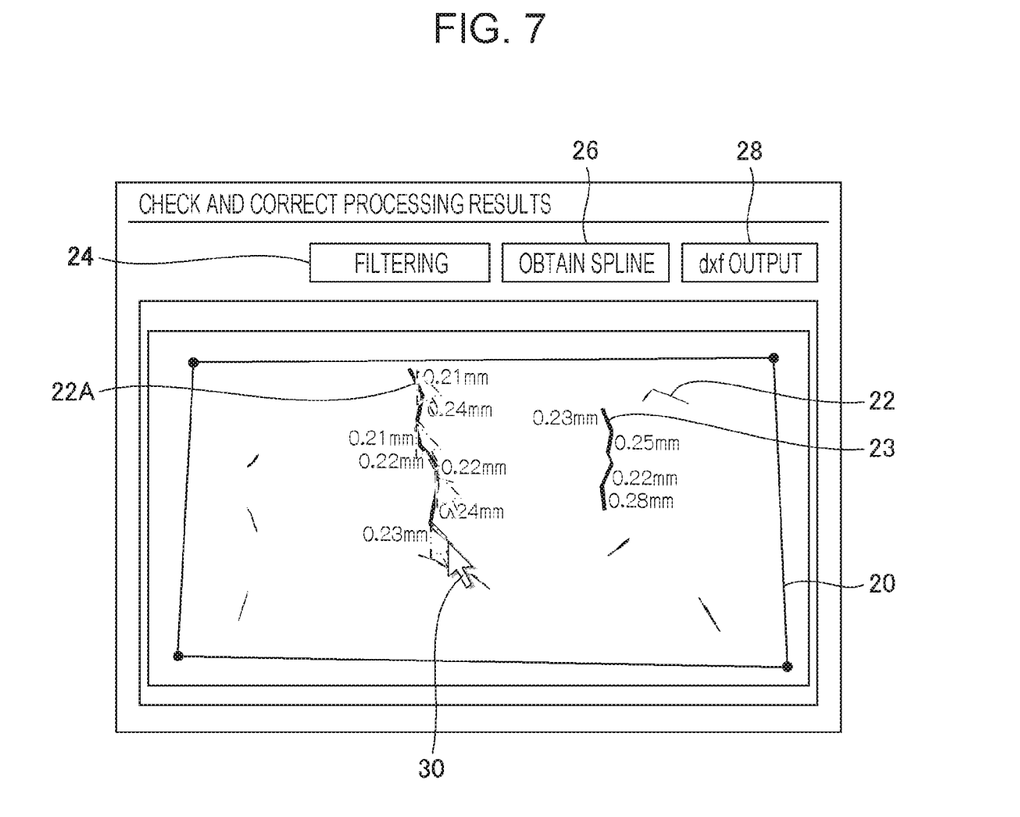
FIG. 7 is a diagram for describing a pointing step.

In the pointing step, by the user pointing a plurality of points through the operation unit 240, control points for controlling an interpolation curve to be created in the subsequent interpolation curve creating step are selected. A point can be pointed, as illustrated in FIG. 7, by the user selecting a pointer 30 displayed on the monitor display unit 232 through the operation unit 240.

As illustrated in FIG. 4 and FIG. 5, the cracks 22 are composed of a plurality of substantially straight cracks with different widths that are continuously connected. In FIG. 4, the cracks 22 have in a zigzag shape. Crack repair is performed in such a manner that the plurality of cracks become a continuous smooth curve. When the cracks are only detected, as illustrated in FIG. 5, shapes of actual cracks are displayed, and thus, the displayed cracks differ from a region in which repair is to be performed. Accordingly, by using points that are pointed through the operation unit 240 in the pointing step, an interpolation curve corresponding to the repair region assumed by the user is created.

As the plurality of points to be pointed, a plurality of points including two points (i.e., a start point and an end point) at both ends of the repair-target crack 22A are selected. Positions are pointed in such a manner that an interpolation curve to be created in the subsequent step is formed near an actual crack. For example, as illustrated in FIG. 7, positions where the direction of a crack changes can be pointed. Also, positions from the start point to the end point can be pointed at equal intervals.

In addition, in a case where a crack is to be repaired by filling the crack with a repair material or injecting a repair material, positions to be filled with the repair material or to which the repair material is to be injected can be pointed. By pointing the positions to be filled with the repair material or to which the repair material is to be injected, a crack can be reliably repaired at the positions. Since the crack can be filled with the repair material or the repair material can be injected at 50 cm intervals, for example, the positions can also be pointed at 50 cm intervals.

The number of positions to be pointed is not limited to a particular number and can be set as appropriate in accordance with the shape of a crack and an interpolation curve to be created. However, if a large number of positions are pointed, the length of an actual crack that is displayed does not differ from the length of the interpolation curve, and, at least, the interpolation curve may not correspond to the position of the actual crack, and some portions may not be repaired.

In addition, as illustrated in FIG. 5, cracks may include a non-repair-target crack 23 (with a width of 0.17 mm) in continuous cracks. In automatic detection, as illustrated in FIG. 6, such cracks are detected as two cracks, a crack 23C and a crack 23C, and regarded as different cracks. In such a case, an end of one of the cracks may be pointed as a start point, an end of the other of the cracks may be pointed as an end point, and a plurality of points therebetween may be pointed, so that the two cracks may be interpolated by one interpolation curve. Also in a case where two or more cracks are preferably repaired continuously, the cracks may be interpolated by one interpolation curve by pointing an end of one of the cracks as a start point, an end of another one of the cracks as an end point, and a plurality of points therebetween.

Note that for a branching crack, an interpolation curve is created for two cracks that are one crack and another one crack starting from a branching point.

Intermediate points other than the two points at both ends of a crack may all be pointed by a user through the operation unit 240, or after the two points at both ends have been pointed, a position of a point or positions of a plurality of points between the two points at both ends may be automatically pointed. As a method for automatic pointing, positions may be pointed at equal intervals from one of the ends, or connecting portions (portions with different widths) or the like of a plurality of cracks may be automatically pointed. In addition, automatic pointing and pointing through the operation unit 240 may be combined. After automatic pointing, for example, if part of a crack is apart from the pointed positions and the crack is also apart from an interpolation curve to be subsequently created, the pointed positions may be increased or changed by an operation through the operation unit 240, so that the interpolation curve may be approximated to the crack.

In addition, the operation unit 240 may correct a position pointed by a user to a position of a crack near the pointed position. If there is an error between the position of a crack and the pointed position, by correcting the pointed position, an interpolation curve approximated to the actual crack can be created.

<Interpolation Curve Creating Step>

Figure 8:
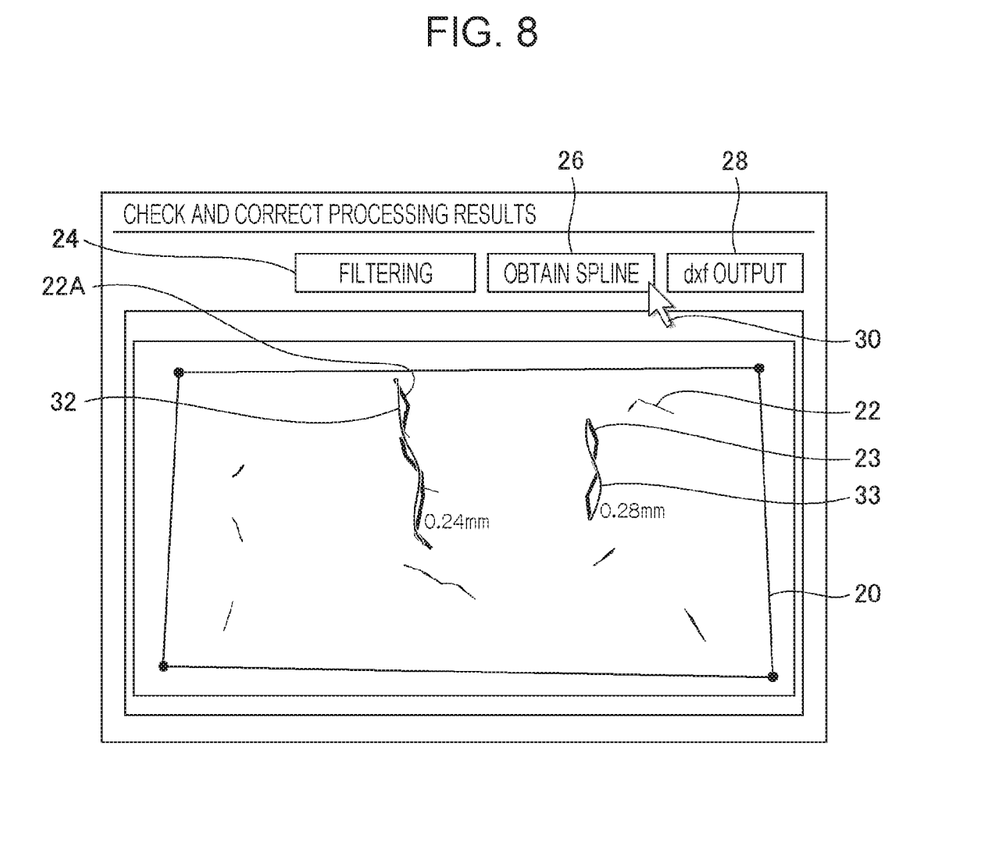
FIG. 8 illustrates interpolation curves displayed in an image.

After the cracks displayed on the monitor display unit 232 have been pointed, interpolation curves are created by using the pointed points (step S110; interpolation curve creating step). The created interpolation curves correspond to repair regions where the repair material is to be actually applied. In FIG. 8, interpolation curves 32 and 33 are displayed in the entire image 20. The interpolation curves are created by pressing an "obtain spline" button 26.

As an interpolation curve, a spline curve or a Bezier curve can be used. The spline curve is a smooth curve in which a plurality of pointed points (control points) control passing points of the curve. The pointed points may or may not pass through the spline curve. As a spline curve, a quadratic spline curve is defined by coordinates of two control points and a control point in front of them. Points other than both ends do not pass through designated control points, but pass though the midpoint of a line segment connecting two adjacent control points. In addition, a cubic spline curve is defined by coordinates of two control points and control points in front of and behind them. Also in the cubic spline curve, points other than both ends do not pass through designated control points.

A Bezier curve is an (N−1)-th-order curve obtained from N control points. In a Bezier curve, a line segment connecting a start point and a first control point is the tangent of the curve at the start point, and a line segment connecting a second control point and an end point is the tangent of the curve at the end point. The Bezier curve passes through designated control points.

Although the pointing step and the interpolation curve creating step are illustrated as different steps in the flowchart in FIG. 3, the interpolation curve creating step may be performed concurrently in the pointing step. If the interpolation curve can be created between previously pointed points during pointing in the pointing step, the interpolation curve can be created while pointing is being performed.

<Repair Length Determining Step>

After an interpolation curve has been created, the length of this interpolation curve is measured (step S112; repair length determining step). By creating the interpolation curve, this interpolation curve can be regarded as the positions at which a crack is to be actually repaired. By measuring the length of the interpolation curve, this length of the interpolation curve can be determined as the repair length. The repair length can also be obtained on the basis of the length of the short side and the length of the long side of the captured image.

<Output Step>

The interpolation curve can be output as drawing information as necessary. In addition, crack information, for example, the width of the crack and the length of the interpolation curve corresponding to the width may be output. Furthermore, a repair method corresponding to the width of the crack may be output (step S114; output step). At least the length of the interpolation curve is calculated as the repair length in this embodiment, and the above information is not necessary output.

As a method for outputting drawing information of the interpolation curve, interpolation curves illustrated in FIG. 8 can be output as a computer-aided design (CAD) diagram in the form of a drawing exchange format (dxf) file. As the drawing information, information of the width of the crack and the length of the interpolation curve (repair length) or the like can also be output. The drawing information can be output by pressing a "dxf output" button 28 illustrated in FIG. 8.

Figure 9:
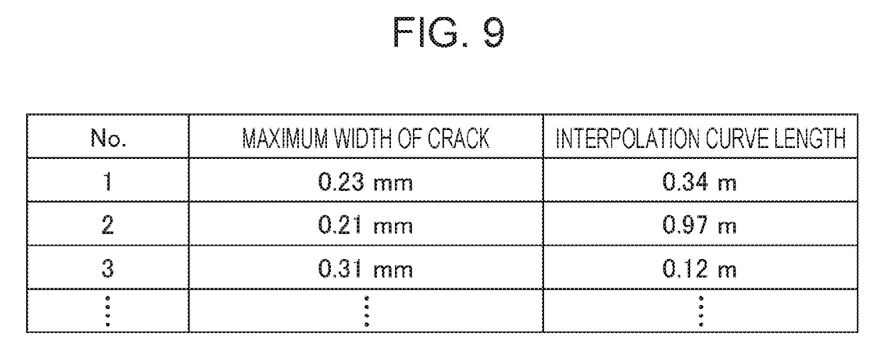
FIG. 9 illustrates an example of crack information.

In a case where the width of the crack, the length of the interpolation curve, and the repair method are output, a comma separated value (CSV) file can be output as table information. In a case where a CSV file is output, as illustrated in FIG. 9, detected cracks may be denoted by numbers (No.), and widths of cracks corresponding to the numbers and lengths of interpolation curves may be output. The width of a crack may be a maximum value or an average value of widths of the crack and may be determined as appropriate in accordance with necessary information.

Figure 10:
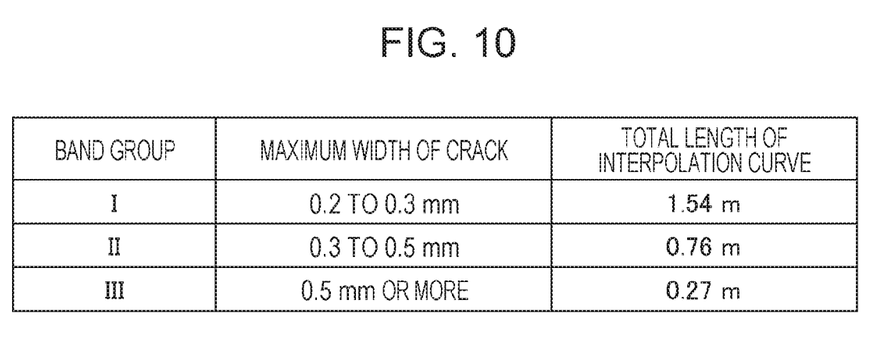
FIG. 10 illustrates another example of the crack information.

In addition, the interpolation curves may be sorted according to the width of a crack among repair-target cracks, and a group of interpolation curves corresponding to the width of the crack may be output (FIG. 10). In FIG. 10, a first group corresponds to a crack width of greater than or equal to 0.2 mm and less than 0.3 mm, a second group corresponds to a crack width of greater than or equal to 0.3 mm and less than 0.5 mm, and a third group corresponds to a crack width of greater than or equal to 0.5 mm. Note that cracks with a width of less than 0.2 mm are non-repair-target cracks. In addition, as interpolation curve information, total lengths of interpolation curve groups are output. By outputting the total lengths of interpolation curve groups, a material necessary for repair or the like can be checked.

Furthermore, a repair method corresponding to the width of a crack may also be displayed. Cracks are repaired differently according to the width of the crack. A crack with a small width is repaired by a surface coating method, that is, a method for covering only a crack part with a covering material. A crack with a large width is repaired by a method for injecting a repair material into the cracks. Since the repair method differs according to the width of the crack in this manner, by outputting information of the repair method, the repair material can be prepared with ease even if there are cracks with different widths.

As data to be output in the output step, data after tilt correction is preferably output. By displaying cracks and interpolation curves in an image that is subjected to tilt correction, it is possible to display and check the interpolation curves in an image that is close to an actual structure, and thus, the amount of a repair material and the like can be checked before repair.

As described above, according to this embodiment, a crack is detected from a captured image of a structure, and a plurality of points including two points at ends of the detected crack are plotted to create an interpolation curve. By determining the length of this interpolation curve, a repair region (repair length) in which repair is to be performed can be accurately calculated.

REFERENCE SIGNS LIST 1 bridge
2 main girder
3 cross beam
4 cross frame
5 lateral frame
6 deck slab
10 image processing system
20 entire image
22, 23, 23C crack
22A repair-target crack
22B non-repair-target crack
24 "filtering" button
26 "obtain spline" button
28 "dxf output" button
30 pointer
32, 33 interpolation curve
100 digital camera
110 imaging optical system 130 wireless communication unit
132, 212 antenna
200 system main body
210 image acquiring unit
220 crack detecting unit
230 display control unit
232 monitor display unit
240 operation unit
242 keyboard
244 mouse
250 interpolation curve creating unit
260 repair length determining unit
270 output unit

What is claimed is:

1. A repair length determination method comprising:
an image acquiring step of acquiring, by an image acquiring circuit, an image obtained by imaging a crack repair target region in a structure;
a detection step of detecting, by a crack detecting circuit, a crack from the acquired image;
a display step of displaying, by a display control circuit, the crack detected in the detection step;
a pointing step of pointing a plurality of points including two points at both ends of the crack in response to an instruction from an operation circuit;
an interpolation curve creating step of creating, by an interpolation curve creating circuit, an interpolation curve by using the points pointed in the pointing step; and
a repair length determining step of determining, by a repair length determining circuit, a length of the interpolation curve and determining a repair length based on the length of the interpolation curve,
wherein, in the display step, at least a repair-target crack and a non-repair-target crack are displayed by changing a display method to be distinguishable from each other in accordance with a width of the crack.

2. The repair length determination method according to claim 1,
wherein the display method is at least one selected from a line color, a line type, and a line blinking speed corresponding to the crack.

3. The repair length determination method according to claim 1, further comprising:
a filtering step of displaying, by the display control circuit, only the repair-target crack.

4. The repair length determination method according to claim 1,
wherein, in the pointing step, on the basis of a result of the crack detected in the detection step, a pointed point is corrected to a position of the crack near a pointed position.

5. The repair length determination method according to claim 1,
wherein, in the pointing step, when the two points at both ends of the crack are pointed, on the basis of a result of the crack detected in the detection step, a position of one point or positions of a plurality of points between the two points at both ends are automatically pointed.

6. The repair length determination method according to claim 1, further comprising:
an output step of outputting, by an output circuit, drawing information of the interpolation curve.

7. The repair length determination method according to claim 6,
wherein, in the output step, data after tilt correction is output.

8. The repair length determination method according to claim 1, further comprising:
an output step of outputting, by an output circuit, information of a width of the crack and a length of the interpolation curve corresponding to the width.

9. The repair length determination method according to claim 8,
wherein the output circuit outputs a repair method corresponding to the width.

10. The repair length determination method according to claim 1,
wherein the interpolation curve is a spline curve or a Bezier curve.

11. A repair length determination apparatus comprising:
an image acquiring circuit that acquires an image obtained by imaging a crack repair target region in a structure;
a crack detecting circuit that detects a crack from the image acquired by the image acquiring circuit;
a display control circuit that displays the crack detected by the crack detecting circuit;
an operation circuit that points a plurality of points including two points at both ends of the crack;
an interpolation curve creating circuit that creates an interpolation curve by using the points pointed by the operation circuit; and
a repair length determining circuit that determines a length of the interpolation curve and determines a repair length based on the length of the interpolation curve,
wherein the display control circuit displays at least a repair-target crack and a non-repair-target crack by changing a display method to be distinguishable from each other in accordance with a width of the crack.

12. The repair length determination apparatus according to claim 11,
wherein the display method is at least one selected from a line color, a line type, and a line blinking speed corresponding to the crack.

13. The repair length determination apparatus according to claim 11,
wherein the display control circuit displays only the repair-target crack.

14. The repair length determination apparatus according to claim 11,
wherein, on the basis of a result of the crack detected by the crack detecting circuit, the interpolation curve creating circuit corrects a point pointed by the operation circuit to a position of the crack near a pointed position.

15. The repair length determination apparatus according to claim 11,
wherein, when the two points at both ends of the crack are pointed, on the basis of a result of the crack detected by the crack detecting circuit, the interpolation curve creating circuit automatically points a position of one point or positions of a plurality of points between the two points at both ends.

16. The repair length determination apparatus according to claim 11, further comprising:
an output circuit that outputs drawing information of the interpolation curve.

17. The repair length determination apparatus according to claim 16,
wherein the output circuit outputs data after tilt correction.

18. The repair length determination apparatus according to claim 11, further comprising:

an output circuit that outputs information of a width of the crack and a length of the interpolation curve corresponding to the width.

19. The repair length determination apparatus according to claim 18,
wherein a repair method corresponding to the width is output.

20. A repair length determination apparatus comprising:
an operation interface; and
a processor configured to acquire an image obtained by imaging a crack repair target region in a structure, detect a crack from the acquired image, control to display the crack on the operation interface, receive designation of a plurality of points including two points at both ends of the crack from the operation interface, create an interpolation curve by using the plurality of points, and determine a length of the interpolation curve to determine a repair length based on the length of the interpolation curve,
wherein the processor is further configured to display at least a repair-target crack and a non-repair-target crack by changing a display method to be distinguishable from each other in accordance with a width of the crack.

21. A non-transitory, tangible computer-readable medium having stored thereon computer instructions that, when executed by a processor, cause the processor to:
acquire an image obtained by imaging a crack repair target region in a structure;
detect a crack from the acquired image;
control to display the crack on an operating interface;
receive designation of a plurality of points including two points at both ends of the crack from the operation interface;
create an interpolation curve by using the plurality of points; and
determine a length of the interpolation curve to determine a repair length based on the length of the interpolation curve,
wherein, when the processor controls to display, at least a repair-target crack and a non-repair-target crack are displayed by changing a display method to be distinguishable from each other in accordance with a width of the crack.

* * * * *